UNITED STATES PATENT OFFICE.

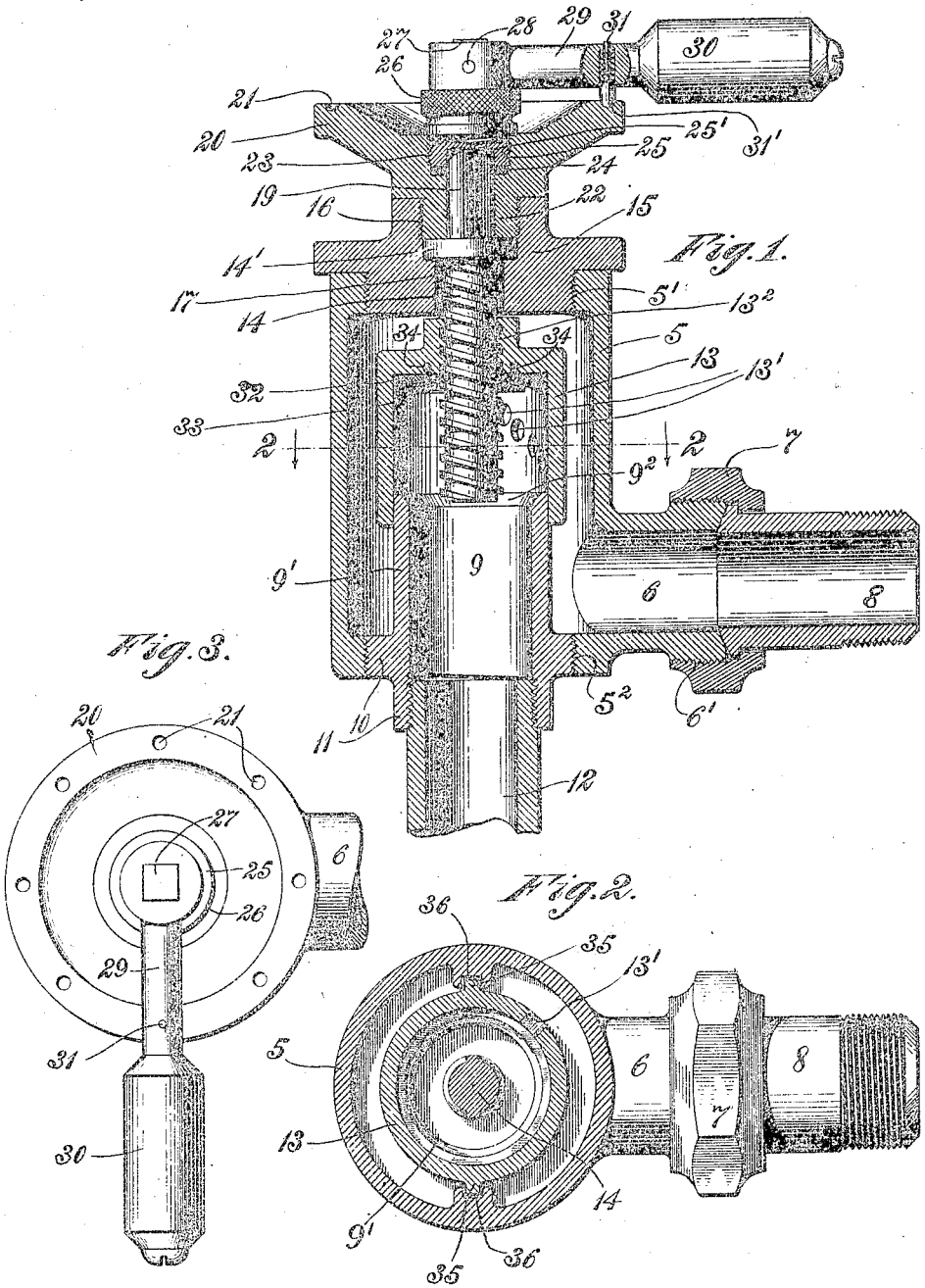

JOSEPH J. STOCKDON, OF SOMERVILLE, MASSACHUSETTS.

VALVE.

No. 922,030.　　　Specification of Letters Patent.　　　Patented May 18, 1909.

Application filed July 3, 1905. Serial No. 268,273.

*To all whom it may concern:*

Be it known that I, JOSEPH J. STOCKDON, a citizen of the United States, residing at Somerville, in the county of Middlesex and State of Massachusetts, have invented certain new and useful Improvements in Valves, of which the following is a specification.

This invention relates to valves, and while especially designed for steam or vapor heating-systems, is not limited in scope to any particular use.

Primarily the object of the invention is the provision of a valve of simple construction, whereby the desired volume of steam or vapor may be admitted to an eduction-conduit of the valve-casing, said conduit leading to a radiator, or to any device in which it is desirable to utilize the steam or vapor.

A further object of the invention is the provision, in connection with a supply-conduit and valve-casing, of a screw-actuated valve of peculiar construction.

Further objects of the invention relate to details of the valve, fully explained in the following description.

In the accompanying drawings, Figure 1 is a longitudinal vertical section of the improved valve. Fig. 2 is a transverse section on line 2—2 of Fig. 1, looking in the direction of the arrow. Fig. 3 is a detail in plan view showing the manner in which the operating lever is secured to the stem of the valve-actuating screw.

Referring to the drawings, the numeral 5 designates a valve-casing, internally threaded at one end at 5', and at the other extremity at 5², and having a branch 6 externally-threaded at 6' to receive a coupling 7 for attaching an eduction-pipe 8 to said branch.

Designated by 9 is a fixture having a collar 10 threaded on its periphery, and provided with an internally-threaded nipple 11, into which the externally-threaded induction-pipe 12 is inserted. This fixture is provided with a barrel 9', flared at 9², to permit of the ready admission of the fluid to be controlled by the valve.

Designated by 13 is the valve proper, which consists of a cylinder in the periphery of which are formed openings 13', preferably disposed in an inclined or spiral line, as illustrated in Fig. 1. This barrel closely fits the periphery of the extension 9' of the fixture 9, and it is internally threaded at 13² to receive a screw 14.

In the top of the valve-casing is a flanged head or plug 15, having a thread which engages the internal-thread 5' of said valve-casing, the flange of said head overlapping the valve-casing, as illustrated in Fig. 1. This head is chambered, and internally-threaded at one end as at 16, and in the chamber is fitted a flange 14' of the screw 14,—the threaded portion of said screw below the flange being received in a bore 17 of the head, and the screw having above the flange, an extension 19 for a purpose hereinafter set forth. A cap 20 having a series of notches 21 in its top, is provided with an externally-threaded extension 22, which is fitted into an internally-threaded socket 16 in the top of the head 15, and bears at its lower end against the flange 14' of the screw 14, to form a tight joint. In the upper portion of the cap is an internally-threaded socket 23, and in said socket is a washer or gasket 24 surrounding the stem 19 of the screw. Threaded into this socket is a screw 25, having a bore 25' through which the stem 19 of said screw passes. This screw is provided with a knurled grasping-surface 26 by which it may be inserted in the socket, and on the end of the stem 19 is an angular head 27 to which is secured by a pin 28, the angular socket of a manipulating-lever 29 having a handle 30 and a spring-actuated locking-pin 31, the end of which is adapted to enter any of the seats or sockets 21 in the cap 20.

In the valve 13, and surrounding the screw, is a gasket 32, secured in place by a washer 33 and rivets 34, said gasket serving, when the valve is completely lowered, to bear against the top of the extension 9' and shut off all supply of fluid to the valve. To prevent axial rotation of the valve, ribs 35 are formed on its periphery, and these ribs fit in guide-grooves 36 on the inner side of the valve-casing 5.

In Fig. 1, the valve is shown fully opened, and steam from the conduit 12 will pass through the entire series of openings 13' into the casing 5, and from said casing 5 through its branch or nipple 6 to the conduit 8 leading to the radiator or other device in which the fluid is to be utilized.

Should it be desired to diminish the supply of steam the handle 30 is grasped and swung around, and to enable this to be done the spring-actuated locking-pin is rounded or inclined at 31' on its lower end, so that it will slip out of the notch 21 in which it is held, will ride around the surface of the cap 20, and will snap into the next or any desired notch of the series, and will thus lock the valve proper 13 in the required position of adjustment.

By forming the ports or openings 13 in a spiral line around the hollow, cylindrical valve 13, the desired discharging capacity is secured in a valve of small size, and, as will be observed, before one port is fully closed another will be partially closed, whereby the supply of fluid may be regulated with the utmost nicety, and, as stated, the full volume of fluid within the capacity of the valve may be delivered, or any part of said volume.

As will be obvious multiple rows of spirally-disposed ports may be formed in the valve, the invention not being limited to the single spiral row shown.

Changes may be made in the form, proportions, and details of the improved valve, and any suitable means may be employed for actuating and locking the screw without departure from the invention.

Having thus described my invention, what I claim is—

1. The combination, with a casing, of a head having a chamber; a screw provided with a collar seated in said chamber; a cap threaded into the head; a tubular valve having a spiral row of ports; an induction conduit on which the valve is sleeved; a lever shaped to engage the valve stem; a spring-actuated plunger carried by said lever; and a device on the valve casing having seats for the reception of said plunger.

2. The combination of a valve casing having an internal cylindrical extension, a valve slidable on said extension exteriorly thereof said valve having a plurality of ports disposed in step order through which fluid over the top of the extension is adapted to pass said valve also having tongues on the exterior thereof and the interior of the casing having grooves to receive said tongues, a screw operatively connected with the valve for moving the same, a hand lever connected with the screw for turning the same, and means coöperative with the hand lever and a fixed part of the casing for holding said hand-lever in different adjusted positions.

In testimony whereof I affix my signature in presence of two witnesses.

JOSEPH J. STOCKDON.

Witnesses:
F. E. ANDERSON,
FRANCES BLODGETT.